(12) United States Patent
Rivas

(10) Patent No.: US 10,843,056 B2
(45) Date of Patent: Nov. 24, 2020

(54) GOLF SIMULATING SYSTEM AND METHOD FOR PLAYING A GOLF GAME PARTIALLY IN A GOLF SIMULATOR AND PARTIALLY ON A GOLF COURSE

(71) Applicant: Luis Rivas, Corona, CA (US)

(72) Inventor: Luis Rivas, Corona, CA (US)

( * ) Notice: Subject to any disclaimer, the term of this patent is extended or adjusted under 35 U.S.C. 154(b) by 26 days.

(21) Appl. No.: 15/901,149

(22) Filed: Feb. 21, 2018

(65) Prior Publication Data

US 2019/0255407 A1 Aug. 22, 2019

(51) Int. Cl.
*A63B 67/02* (2006.01)
*A63F 13/46* (2014.01)
*A63F 13/812* (2014.01)

(52) U.S. Cl.
CPC .............. *A63B 67/02* (2013.01); *A63F 13/46* (2014.09); *A63F 13/812* (2014.09)

(58) Field of Classification Search
CPC ........ A63B 67/02; A63B 13/46; A63B 13/812
See application file for complete search history.

*Primary Examiner* — Kevin Y Kim

(57) ABSTRACT

A golf simulating system and method for playing a golf game partially in a golf simulator and partially on a real golf course that allows a player to strike a virtual golf ball in a golf simulator from a virtual teeing area and a virtual fairway. Upon the ball reaching the virtual putting area, the player moves to putt a real golf ball in a real putting area. The player then moves to a real putting area to continue the golf game by putting the real golf ball. The starting position of the real golf ball is based on tracking the position of the virtual golf ball. Oral or visual instructions prompt the player where to place the golf ball on the real putting area. The score is automatically calculated based on the player's performance in the two areas combined within the proprietary software.

20 Claims, 8 Drawing Sheets

GOLF SIMULATING SYSTEM AND METHOD FOR PLAYING A GOLF GAME PARTIALLY IN A GOLF SIMULATOR AND PARTIALLY ON A GOLF COURSE

CROSS REFERENCE OF RELATED APPLICATIONS

This application claims the benefits of U.S. provisional application No. 62/461,746, filed Feb. 21, 2017 and entitled SYSTEM AND METHOD FOR PLAYING A GOLF GAME PARTIALLY IN A GOLF SIMULATOR AND PARTIALLY ON A REAL GOLF COURSE, which provisional application is incorporated by reference herein in its entirety.

FIELD OF THE INVENTION

The present invention relates generally to a golf simulating system and method system and method for playing a golf game partially in a golf simulator and partially on a real golf course. More so, a golf simulator system and method for playing a golf game simulates indoors a game of golf as it would be played outdoors on a conventional golf course by allowing a player to strike a golf ball in a golf simulator from a virtual teeing area and a virtual fairway; and upon the virtual ball reaching a virtual putting area, the player then moves to the identical position in the real world green, and the player putts a real golf ball in a real putting area to continue the golf game by putting a golf ball.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, golf is a club and ball sport in which players use various clubs to hit balls into a series of holes on a course in as few strokes as possible. The game at the highest level is played on a course with an arranged progression of 18 holes, though recreational courses can be smaller, usually 9 holes. Each hole on the course must contain a tee box to start from, and a putting green containing the actual hole or cup. There are other standard forms of terrain in between, such as the fairway, rough, sand traps, and various hazards, such as water and rocks. However, each hole on a course is unique in its specific layout and arrangement.

Typically, a golf simulator allows golf to be played on a graphically or photographically simulated driving range or golf course, usually in an indoor setting. It is a technical system used by some golfers to continue their sport regardless of weather and time of day in a converted premises. Advanced systems may utilize a dedicated room, hitting screen, projector, and other paraphernalia.

It is known that outdoor sports, often utilize balls which are struck or thrown by a player, either directly using their hands or feet, or using a golf club, bat, racquet, or other device. Such games include golf, basketball, soccer, baseball, tennis, and hockey. Players of such games continually seek to improve their ball handling and aiming skills. There is therefore a large demand for practice areas for skill improvement in ball sports, such as golf.

It is known in the art that computer-based golf simulators have been developed to allow the player to practice indoors, in a relatively small area. Such simulators typically have an enclosure with a screen at one end, onto which an image of a fairway or part of a golf course is displayed. The player drives a ball towards the screen, and sensors are used to provide signals to a computer, which determines the trajectory the ball would have had if it had not been stopped by the screen. The computer then produces a video image of the ball traveling down the fairway.

Other proposals have involved golf simulating trainers and methods for improving golf games. The problem with these simulators is that they do not optimize space for golf games. Also, they do not replicate outdoor environments for putting and short wedge play. Even though the above cited golf simulating trainers and methods for improving golf game meet some of the needs of the market, a golf simulating system and method for playing a golf game partially in a golf simulator and partially on a real golf course is still desired. It is known that resources used for traditional golf course design are scarce. This system and method utilizes the ball flight technology, attached to a regular golf green to create a game of golf.

SUMMARY

Illustrative embodiments of the disclosure are generally directed to a golf simulating system and method for playing a golf game partially in a golf simulator and partially on a real golf course. The golf simulation system and method serves to simulate, indoors a game of golf as it would be played outdoors on a conventional golf course by allowing a player to strike a golf ball in a golf simulator from a virtual teeing area and a virtual fairway; and upon the virtual ball reaching a virtual putting area.

In one embodiment, a player strikes a golf ball in a golf simulator from a virtual teeing area and a virtual fairway. Upon the ball reaching the virtual putting area, the player moves to putt or chip a real golf ball in a real putting area. The player then moves to a real putting area to continue the golf game by putting or chipping the real golf ball. The starting position of the real golf ball is based on tracking the position of the virtual golf ball. Oral or visual instructions prompt the player where to place the golf ball on the real putting area regulation green. The score is automatically calculated based on the player's performance in the two areas combined within the proprietary software In some embodiments, the method for playing a golf game partially in a golf simulator and partially on a real golf course comprises an initial Step of providing a golf simulator for playing a golf game at least partially in the golf simulator, the golf simulator comprising a golf ball, a virtual teeing area, a virtual fairway, and a virtual putting area. Another Step may include providing at least a portion of a real golf course for playing the golf game at least partially on the real golf course, the real golf course comprising an 18 hole golf course, a real golf ball, and a real putting area.

The method may also include a Step of providing a software application for tracking the position of the virtual golf ball, the position of the real golf ball, and a player, the software application being operable on a portable communication device. In some embodiments, a Step comprises striking the virtual golf ball from the virtual teeing area. Another Step includes tracking the position of the golf ball from the virtual teeing area to the virtual fairway. Another Step includes striking the golf ball from the virtual fairway.

The method may also include a Step of tracking the position of the virtual golf ball across the virtual fairway to the virtual putting area. A Step comprises ascertaining, through a virtual grid, a starting position for the real golf ball in the real putting area, based on the position of the virtual golf ball in the virtual putting area. Another Step includes articulating, through the portable communication device, at least one oral or visual instruction to indicate the position of the real golf ball on the real putting area.

The method may also include a Step of articulating, through the portable communication device, the at least one oral or visual instruction to relay at least one golf related information. A Step includes putting the real golf ball towards a target in the real putting area. In some embodiments, the method includes a Step of calculating a golf score based partially on strikes at the golf ball from the virtual teeing area and the virtual fairway, and partially on strikes at the real golf ball from the real putting area.

In another aspect, the steps including, articulating at least one oral or visual instruction, are operable with the portable communication device.

In another aspect, the method further comprises a step of articulating the at least one oral or visual instruction to indicate the virtual position of the golf ball on the virtual teeing area and the virtual fairway.

In another aspect the real putting area comprises a hole, a sand bunker, and a hazard.

In another aspect the method further comprises a step of providing software application for tracking the virtual position of the golf ball, the real position of the golf ball, and the player.

In another aspect, the software application is operable on a portable communication device.

In another aspect, the method further comprises a step of articulating the at least one oral or visual instruction to indicate the virtual position of the golf ball on the virtual teeing area and the virtual fairway.

In another aspect, the real putting area comprises a hole, a sand bunker, a rough, and a hazard.

One objective of the present invention is to provide a hybrid golf game that is partially played in a golf simulator and partially played on a real golf course, i.e., putting area.

Another objective is to reduce the amount of real state and maintenance of a golf course to play a round of golf.

Another objective is to provide a software application that tracks and articulates the virtual position of the golf ball, as well as the corresponding real position of the golf ball during play.

Another objective is to provide a golf game that can be played on an inexpensive, basic, municipal course; or a high end, private, country club, very lavish golf course.

Another objective is to provide a golf game that reduces the burden of cost, time, sun exposure, and difficulty level of playing golf to the consumer.

Another objective is to eliminate 95% of the land needed for golf play; as well as 95% of the water necessary for irrigation, maintenance costs, pesticides, etc.

Another objective is to provide a golf game that provides a more profitable business model, and a more fun experience for the consumer.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 4A is a nine hole golf course, and FIG. 4B is an eighteen hole golf course, in accordance with an embodiment of the present invention;

Like reference numerals refer to like parts throughout the various views of the drawings.

DETAILED DESCRIPTION OF THE INVENTION

Figure 1:
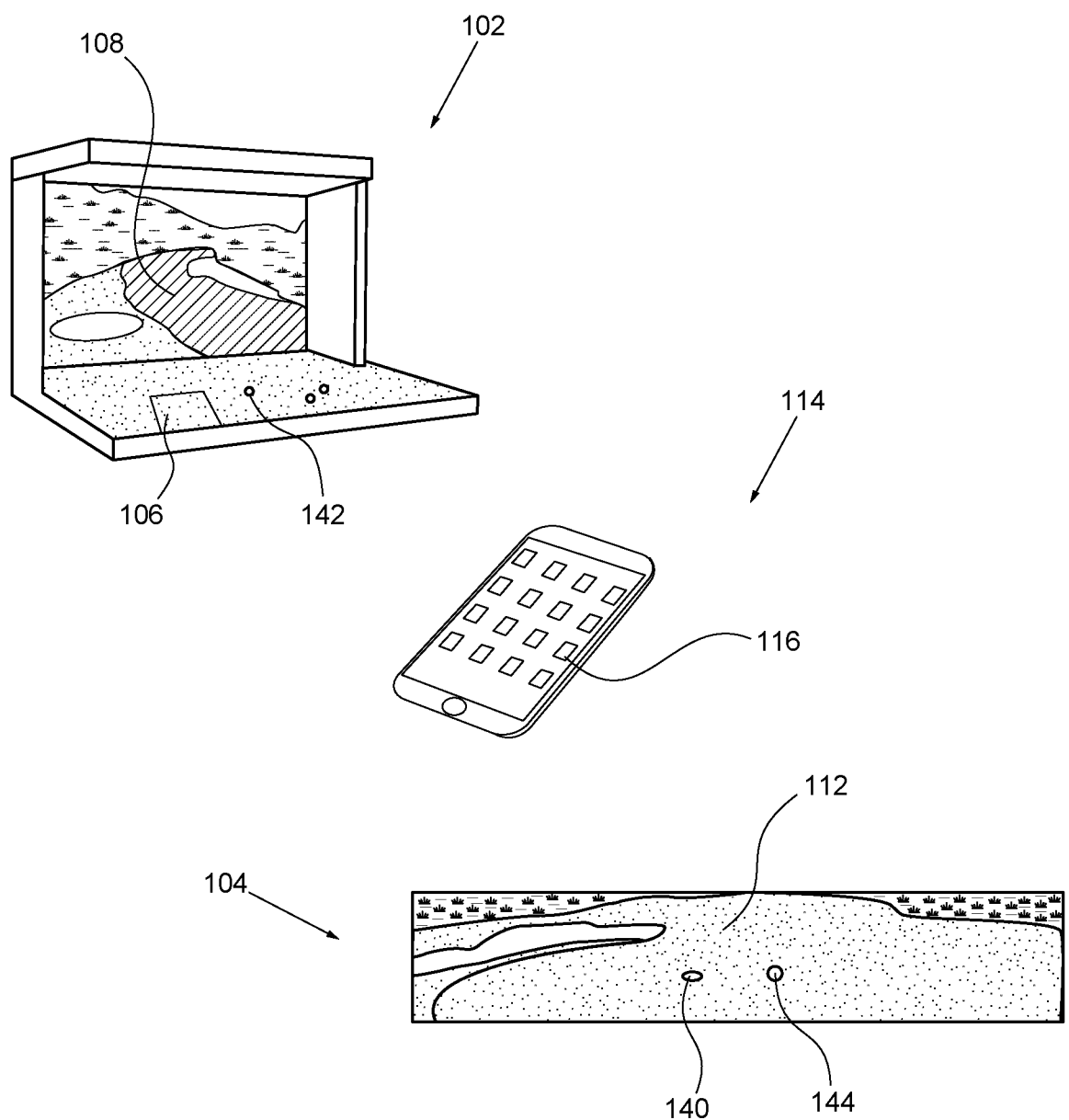
FIG. 1 illustrates a diagram of an exemplary system for playing a golf partially in a golf simulator and partially on a real golf course, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

In one embodiment of the present invention presented in FIGS. 1-7, a system 100 and method 200 for playing a golf game partially in a golf simulator and partially on a real golf course, allows a player to play a portion of a golf game in a golf simulator 102, and a portion of the golf game on a real golf course 104. As FIG. 1 references, the system 100 allows a player 124a to strike a golf ball 142 in a golf simulator 102 one a virtual teeing area 106, a virtual fairway 108; and virtual putting area 110; and then finish the golf game by putting a real golf ball 144 on a real putting area 112 of a real golf course 104.

In one non-limiting embodiment, the golf simulator 102 is operable indoors in a building 128. The golf simulator 102 may include a virtual teeing area 106, a virtual fairway 108, and a virtual putting area 110. After the virtual golf ball 142 reaches the virtual putting area 110, the player then moves to a real putting area 112 to continue the golf game by putting a real golf ball 144 towards a target 140 in the real putting area 112. The position of the real golf ball 144 on the real putting area 112 is determined by tracking the virtual position of the virtual golf ball 142 as it is hit through the virtual teeing area 106, the virtual fairway 108, and finally the virtual putting area 110.

In another embodiment, the golf simulator 102 comprises an enclosure with a screen at one end, onto which an image of a fairway or part of a golf course is displayed. The player drives a ball towards the screen, and sensors are used to provide signals to a computer, which determines the trajectory the virtual golf ball 142 would have had if it had not been stopped by the screen. The computer then produces a video image of the ball traveling down the fairway. A virtual grid 126 may be used by the sensors and computer to determine the flight pattern and landing position for the virtual golf ball 142, and eventually the starting position of the player on the real putting area 112 of the real golf course 104. Though other forms of simulators known in the art may also be used.

During initial operation of the system 100, multiple players 124a-d enter a virtual golf simulator 102, which may be located indoors in a building 128. The players 124a-d, or single player 124a, strike a virtual golf ball 142 from a virtual teeing area 106 to a virtual fairway 108 in the golf simulator 102. The player 124a then strikes the virtual golf ball 142 to the virtual putting area 110. Upon the virtual golf ball 142 reaching the virtual putting area 110, the player moves to the real golf course 104 to putt a real golf ball 144 from a real putting area 112.

The starting position of the real golf ball 144 on the real putting area 112 is based on tracking the virtual position of the virtual golf ball 142 through the virtual teeing area 106 and the virtual fairway 108 to the virtual putting area 110. The virtual golf ball 142 may be tracked through use of a virtual grid 126, global positioning systems, algorithms, sensors, high speed cameras, and other tracking means known in the art.

In one possible embodiment of operation of golf simulator 102, the player may stand on a platform, called a swing pad, in front of a projector screen. The swing pad often has fake grass and a tee to simulate real-world conditions. At the same time, the screen displays a realistic image of a golf course, complete with grass and skies. The player steps up, swings, and hits the ball right at the screen, similar to a driving range. The golf simulator 102 may utilize sensors designed to analyze the speed, ball flight pattern, and other pertinent data related to the virtual golf ball 142 and player.

In yet other embodiments, the golf simulator 102 may include a virtual golf simulation apparatus and a swing plate, which facilitate a player enjoying a virtual golf game to simply select a particular menu on a display or to select a particular operation. Those skilled in the art will recognize that such a realistic virtual golf simulation enables the player to practice golf and enjoy a virtual golf game. In some embodiments, the golf simulator 102 may utilize existing simulator technology including: Full Swing Golf©, About Golf©, HD Golf©, TruGolf©, SwingTrack©, OptiShot©, Trackman©, Foresight Sports©.

In one non-limiting embodiment, the system provides audible instruction to the player on either the golf simulator 102, or the real golf course 104. Through a portable communication device 114, at least one oral or visual instruction may be articulated on the real putting area 112 to prompt the player where to place the real golf ball 144 on the real putting area 112, and to provide other putting and golf related tips. The oral or visual instructions may also be articulated in the golf simulator 102. Further, the system 100 automatically calculates the score of the player from the combined play, or number of strikes, on the virtual and real golf balls 142, 144 on the virtual teeing area 106, the virtual fairway 108, and the real putting area 112.

Figure 2:
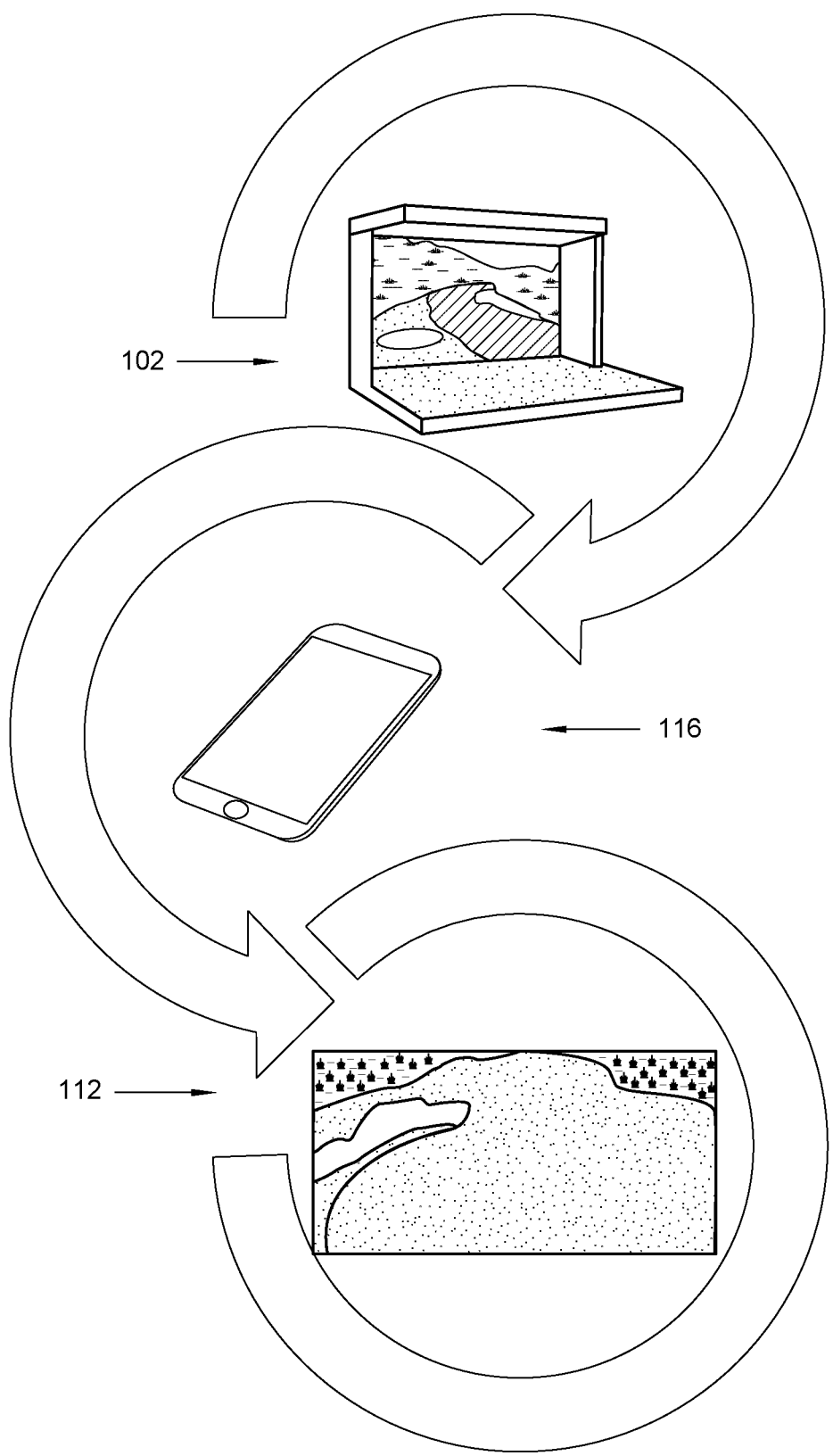
FIG. 2 illustrates a diagram of a system for playing a golf partially in a golf simulator and partially on a real golf course, showing how the software application combines a golf simulator with a real golf course, in accordance with an embodiment of the present invention.

FIG. 2 illustrates a perspective view of an exemplary system 100 for playing a golf partially in a golf simulator and partially on a real golf course, showing a software application 116 that integrates a golf simulator 102 with a real golf course 104. The system 100 provides a software application 116 that helps the player play the golf game, and also transition from the virtual golf course to the real golf course 104.

The software application 116 enables the player to track a virtual position of the virtual golf ball 142 from the virtual teeing area 106, the virtual fairway 108, and finally to a virtual putting area 110. The software application 116 also tracks the player to a starting position on the real putting area 112, and tracks the real golf ball 144. The software application 116 is operatively connected to a tracking system 100, such as GPS. The software application 116 is operable on a portable communication device 114. The player may use the software application 116 to monitor the golf course 104 and the position of the golf ball through the communication device 114, such as a smart phone, tablet, or laptop.

Those skilled in the art will recognize that golf is a club and ball sport in which players use various clubs to hit balls into a series of holes on a golf course in as few strokes as possible. For purposes of this system 100 and method 200, the virtual teeing area 106 and the virtual fairway 108 are played in a golf simulator 102. The real putting area 112, i.e., green, is played on a real golf course 104.

In the present disclosure, the first section of every hole consists of the teeing area. There is typically more than one available box where a player places the golf ball, each one a different distance from the hole (and possibly with a different angle of approach to the green or fairway) to provide differing difficulty. After the first shot from the tee (teeing off), the player then hits the golf ball towards the green—from where it came to rest, known as the lie. When the ball is in play and not out of bounds or in a hazard the player must play the ball as it lies.

In the present disclosure, the putting portion of play occurs on a real golf course 104. A putting area, or green, may include very closely trimmed grass on relatively even, smooth ground surrounding the hole, allowing players to make precision strokes on it. The putting area may also include sand bunkers and other hazards in proximity to the hole. To putt is defined as playing a stroke on this surface, usually with the eponymous putter club, which has a very low loft so that the golf ball rolls smoothly along the ground, and hopefully into the hole. In one embodiment, the target 140, or hole is about 4.25" in diameter.

During the duration of the golf game, a golf ball and the player are tracked from the virtual teeing area 106, the virtual fairway 108, and the virtual putting area 110 to a starting position on the real putting area 112. After the golf ball has been virtually driven through the virtual teeing area 106 and the virtual fairway 108, the starting real position of a golf ball on a real putting area 112 is based on the tracked virtual position of the golf ball.

In some embodiments, the system 100 articulates oral or visual instructions to the player while the player is on the real putting area 112. The oral or visual instructions prompt the player where to place the golf ball on the putting area for putting towards the hole. The initial placement of the golf ball is based on the virtual position of the golf ball from the virtual teeing area 106, the virtual fairway 108, and the virtual putting area 110. The oral or visual instructions may also include putting and golf related information, such as food and beverage requests, historical highlights, pro shop requests, medical assistance, etc. The system 100 also calculates the score of the player from play on the virtual teeing area 106, the virtual fairway 108, and the real putting area 112.

Figure 3A:
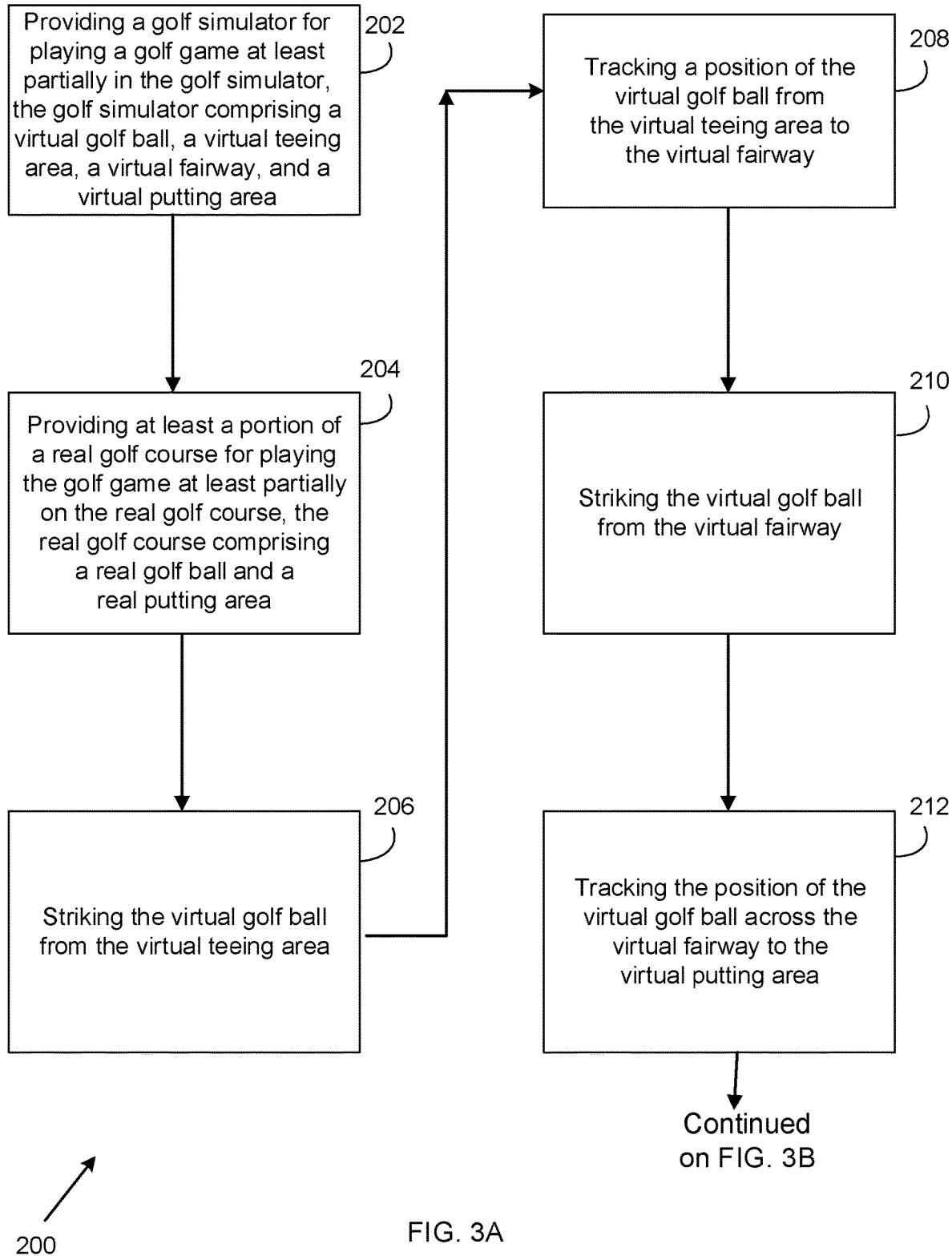
FIGS. 3A and 3B illustrate a flowchart diagram of an exemplary method for playing a golf game partially in a golf simulator and partially on a real golf course, in accordance with an embodiment of the present invention.
Figure 3B:
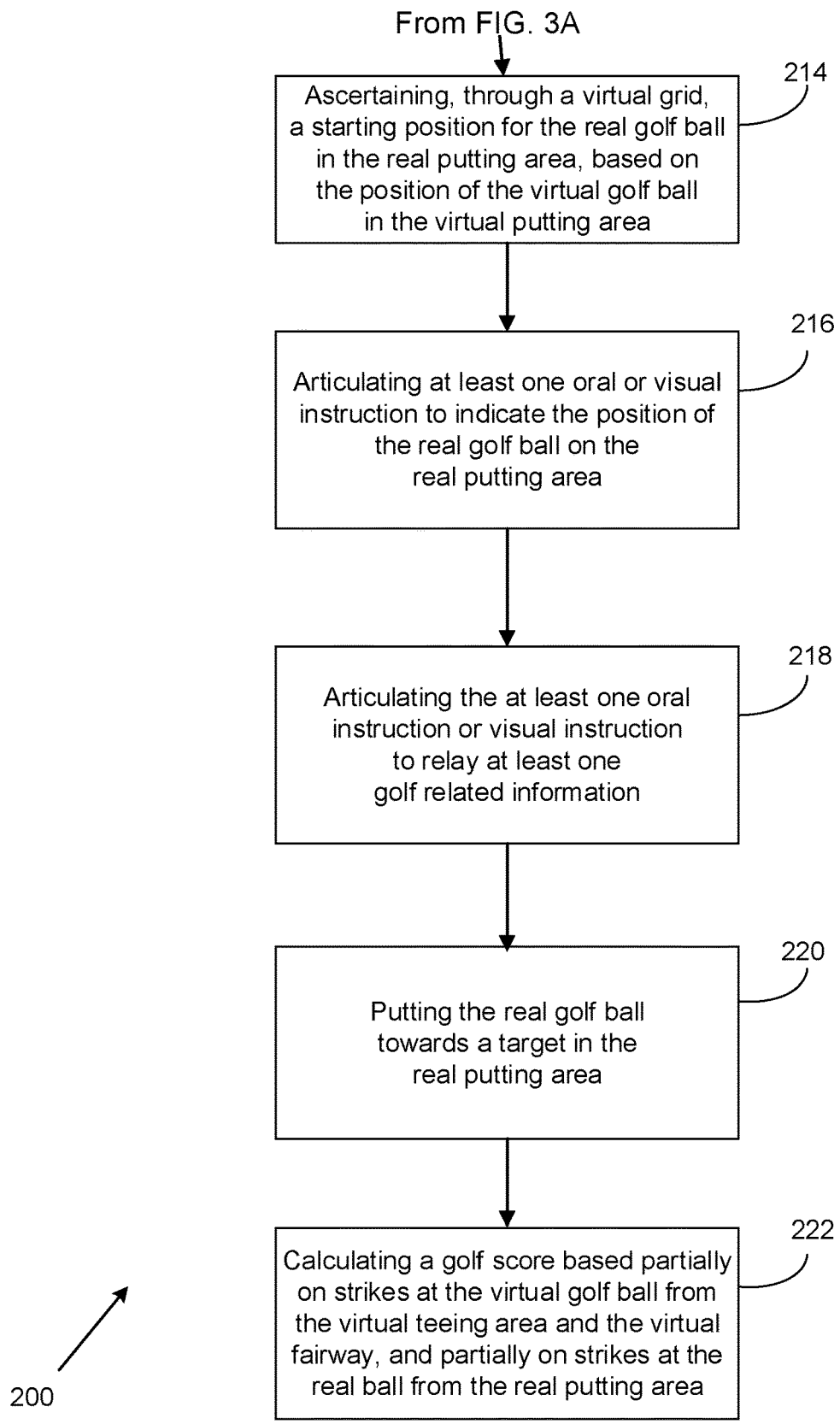

FIGS. 3A and 3B illustrates a flowchart, referencing a method 200 for playing a golf game partially in a golf simulator and partially on a real golf course. The method 200 may include an initial Step 202 of providing a golf simulator 102 for playing a golf game at least partially in the golf simulator, the golf simulator comprising a virtual golf ball, a virtual teeing area, a virtual fairway, and a virtual putting area.

In one possible embodiment of the golf simulator 102, a screen golf apparatus senses the speed and direction of a golf ball that a player hits onto a screen installed indoors for displaying a virtual golf range, and displays the trajectory of the shot on the screen. The screen golf apparatus implemented using a virtual golf simulation characteristically offers the same sense of reality that the player would feel in a real golf course, when the player hits the golf ball in the same manner as in a golf practice range with a golf ball.

The method 200 may further comprise a Step 204 of providing at least a portion of a real golf course for playing the golf game at least partially on the real golf course, the real golf course comprising a real golf ball and a real putting area. The real putting area 112 may include a hole, a sand bunker, a rough, and at least one hazard known in the art of golfing.

Figure 4A:
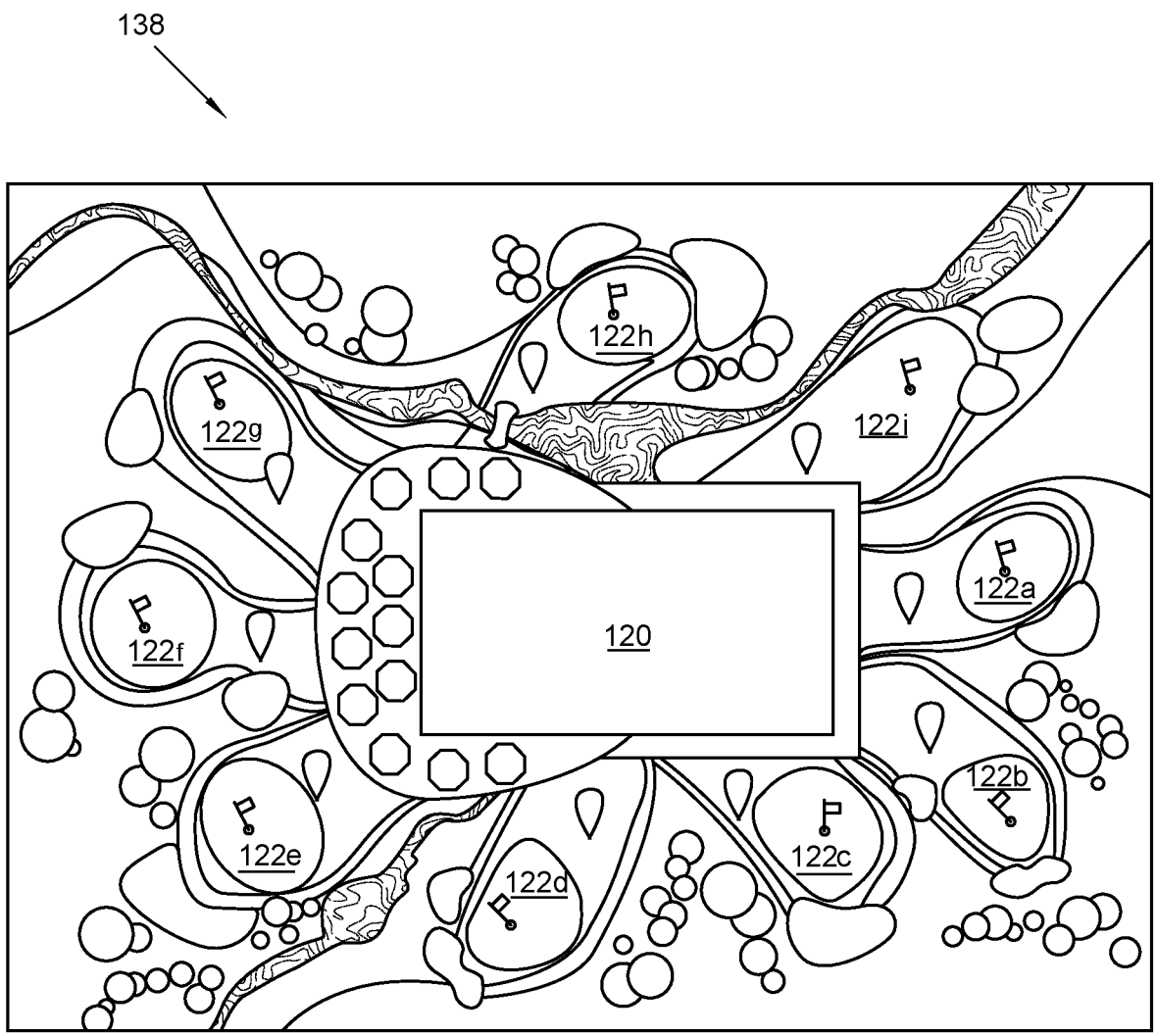
FIGS. 4A and 4B illustrate topographical views of an exemplary golf course, where
Figure 4B:
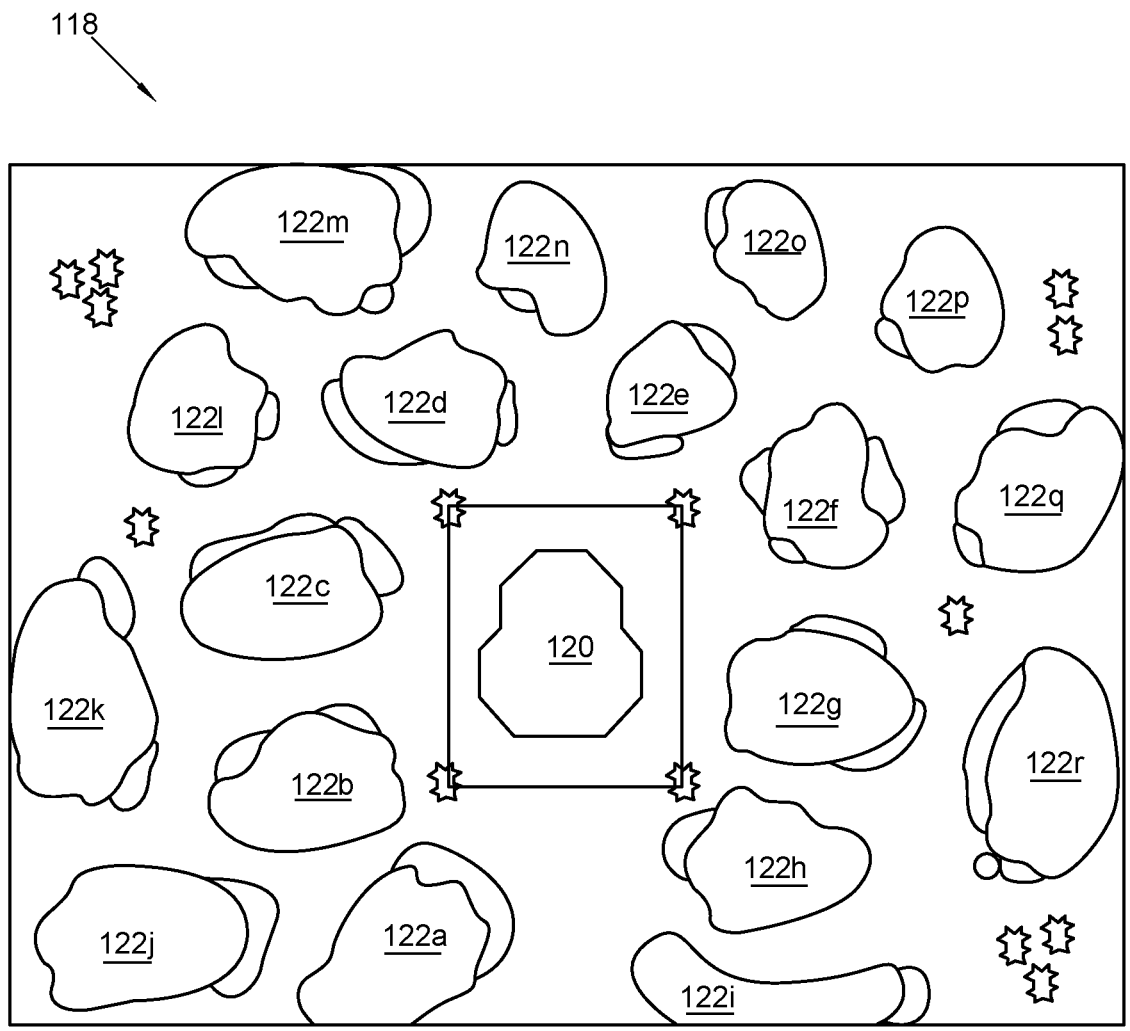

As FIG. 4A shows, the golf course 104 may include a nine hole version of golf courses known in the art. The nine hole golf course 138 provides a centrally located teeing area 120, and nine real putting areas 122*a-i* strategically surround the teeing area 120. Though in some embodiments, an 18 hole golf course 118 may be used, as shown in the topographical view in FIG. 4B. Here, the 18 hole golf course 118 provides a centrally located teeing area 120, and eighteen real putting areas 122*a-r* strategically surround the teeing area 120. Furthermore, the concept can be deployed on smaller footprints. For example on 1, 3, or 6 hole golf courses; or even 27 or 36 hole golf courses.

Figure 7:
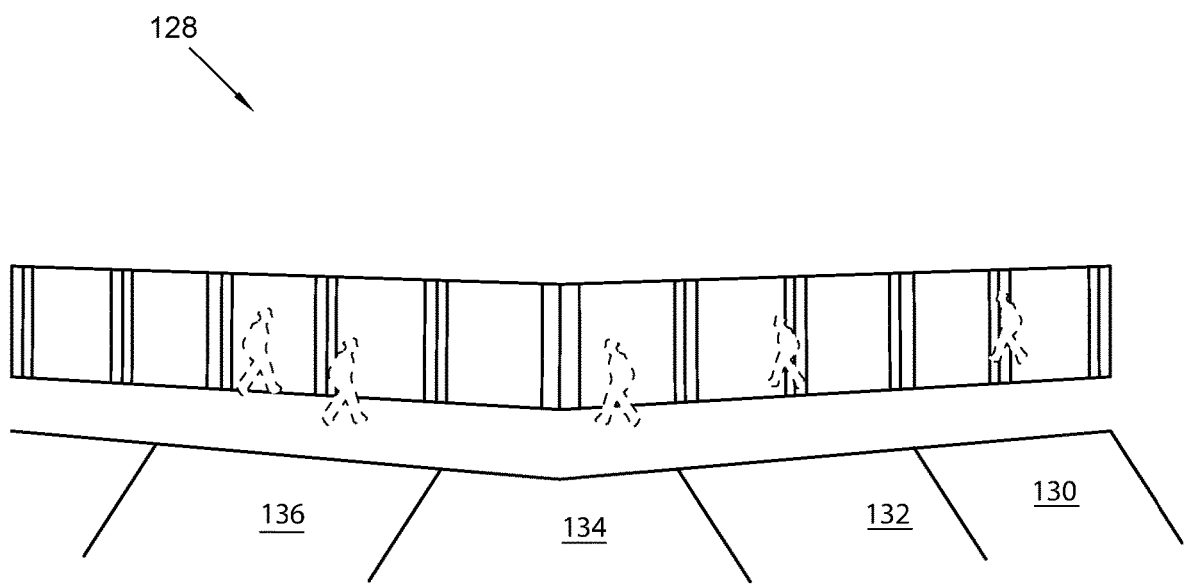
FIG. 7 illustrates a perspective view of an exemplary building housing a golf simulator and separate doorways to the different course holes, in accordance with an embodiment of the present invention.

In some embodiments, a Step 206 includes striking the virtual golf ball from the virtual teeing area. A Step 208 comprises tracking a position of the virtual golf ball from the virtual teeing area to the virtual fairway. A Step 210 includes striking the virtual golf ball from the virtual fairway. As discussed above, the player swings for the golf ball in the golf simulator 102. After the player strikes the golf ball onto the virtual putting area, the player then proceeds to the real golf course. FIG. 7 illustrates a perspective view of an exemplary building 128 housing the golf simulator and separate doorways to the different putting areas, showing exemplary Hole #3 130; Hole #4 132; Hole #5 134; and Hole #6 136.

In some embodiments, a Step 212 may include tracking the position of the virtual golf ball across the virtual fairway to the virtual putting area. During the duration of the golf game, a golf ball and the player are tracked from the virtual teeing area 106 and the virtual fairway 108 to a starting position on the real putting area 112. After the golf ball has been virtually driven through the virtual teeing area 106 and the virtual fairway 108, the starting real position of a golf ball on a real putting area 112 is based on the virtual position of the golf ball through the virtual teeing area 106 and the virtual fairway 108.

The method 200 enables the articulation of oral or visual instructions to the player while the player is on the real putting area 112. The oral or visual instructions are heard from the communication device 114 carried by the player. In some embodiments, the oral or visual instructions prompts the player where to place the golf ball on the putting area for putting towards the hole. The initial placement of the golf ball is based on the virtual position of the golf ball from the virtual teeing area 106 and the virtual fairway 108.

Figure 5:
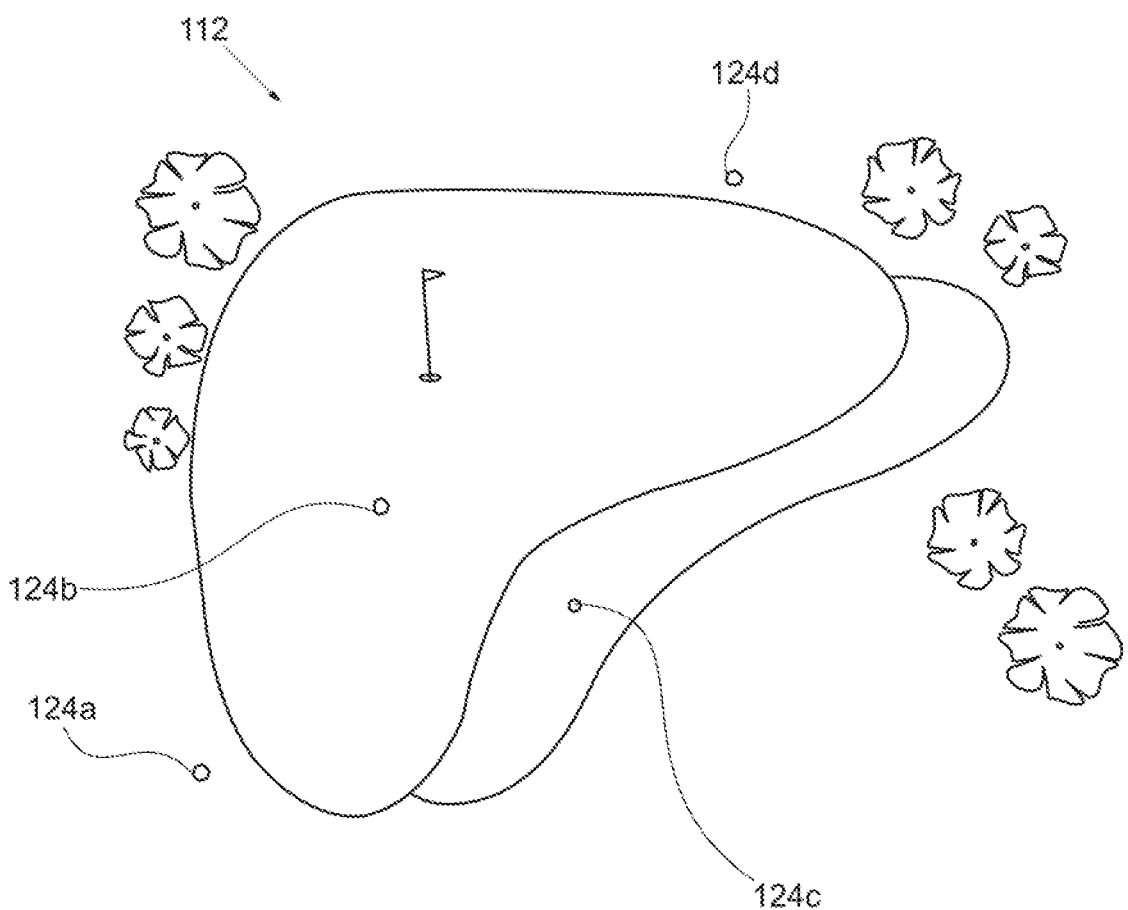
FIG. 5 illustrates a perspective view of an exemplary real putting area with four golf balls positioned in different sections, in accordance with an embodiment of the present invention.

FIG. 5 shows a real putting area 112, where multiple players 124*a-d* have their golf balls positioned for putting, based on the virtual play of the golf balls. In this example, a first player 124*a* golf ball came to rest in the rough short of the real putting area 112, a second player 124*b* golf ball landed on the real putting area 112, a third player 124*c* golf ball hit a bunker, and a fourth player 124*d* golf ball went long to the rough behind the real putting area 112.

Figure 6:
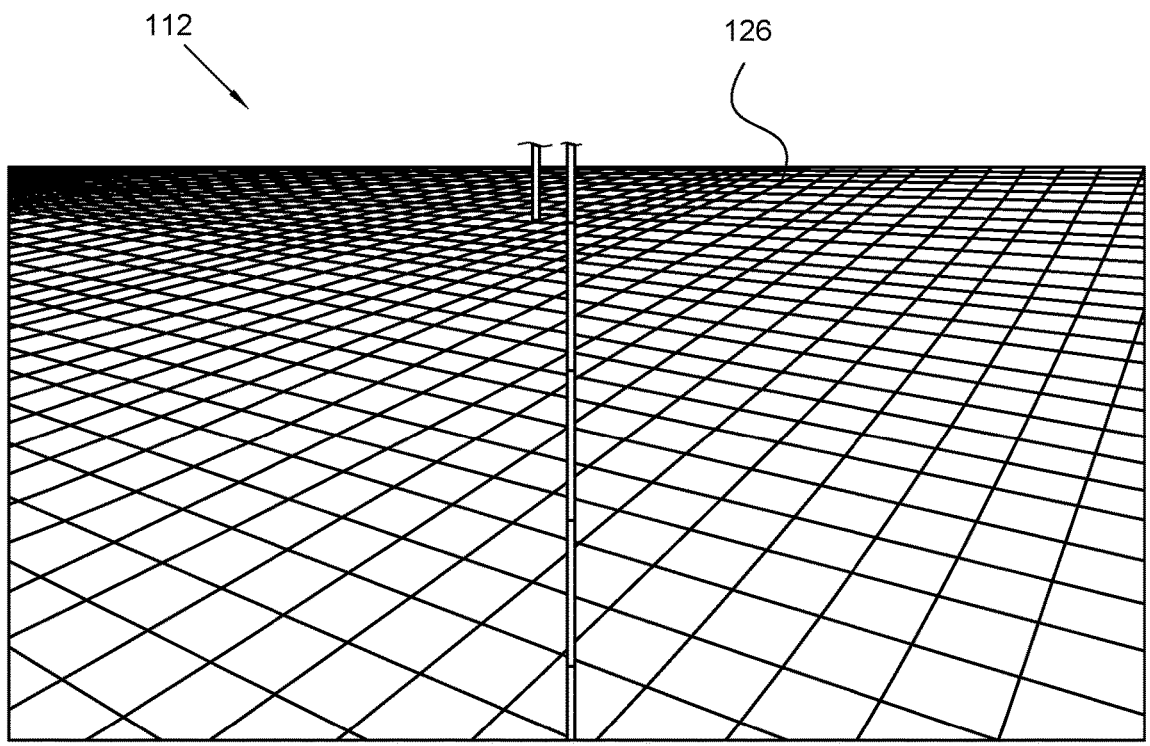
FIG. 6 illustrates a perspective view of an exemplary real putting area with a virtual grid superimposed on top for tracking the player and the golf ball, in accordance with an embodiment of the present invention.

A Step 214 comprises ascertaining, through a virtual grid, a starting position for the real golf ball in the real putting area, based on the position of the virtual golf ball in the virtual putting area. FIG. 6 illustrates the virtual grid 126 laid across the virtual putting area 110. The grid 126 is used to track the virtual position of the golf ball, and correlate this to a real position for the golf ball. The virtual putting area 110 and surrounding area in the golf simulator 102, and the regulation real putting area 112, are identical, including the virtual grid 126 laid over the entire area of the virtual putting area 110 to locate the golf ball.

The method 200 may further comprise a Step 216 includes articulating at least one oral or visual instruction to indicate the position of the real golf ball on the real putting area. The player moves to the precise location on the real putting area 112, as directed by the software application 116 whether on the green, in the rough, or in a sand bunker. The golf ball is placed at this precise location to finish game play on the real putting area 112.

A Step 218 comprises articulating the at least one oral or visual instruction to relay at least one golf related information. Examples of oral or visual instructions may include, without limitation, "Great shot, you're on the putting surface, you will only need your putter"; and "You're in the rough, bring your wedges and your putter." This articulated information may be repeated through the number of holes the player chooses to play. In some embodiments, the player may choose how much golf to play, and when to take food or beverage breaks, during the "everlasting" or "timeless" round. In alternative embodiments, party groups comprising "6 some" groups are encouraged as the system 100 design solves the pace of play issues of traditional golf.

In some embodiments, a Step 220 includes putting the real golf ball towards a target in the real putting area. As discussed above, the real putting area 112 may include a sand bunker or a hazard known in the art. At this point, the player has now completed the simulator part of game play. As the player leaves the golf simulator 102, or "Cabana" area where the simulator is located, the software application 116 tracks each player individually on a device comprising of a communication device 114, such as a smart phone, an iOS, and an Android device.

A Step 222 comprises calculating a golf score based partially on strikes at the virtual golf ball from the virtual teeing area and the virtual fairway, and partially on strikes at the real golf ball from the real putting area. The software application 116 works to calculate the score between virtual and real portions by adding the strokes from the two areas to create the player's score on the hole. In essence, the scores from strokes on the virtual teeing area 106, the virtual fairway 108, and the real putting area 112 are combined to produce a standard golf score known in the art.

For example, in a Par 3 golf course 104, player "A" in the golf simulator 102 tees off and lands in a bunker. After proceeding to the same location on the green directed by the oral articulation from the software application 116, player "A" finishes on the real putting area 112 with a shot out of the bunker, and two putts. The player scorecard on the software application 116 indicates a +1 bogie as in traditional golf, based on both the virtual areas in the golf simulator 102, and the real putting area 112 on the golf course 104. This combination translates into a 4 (1+3), on a par 3, which those skilled in the art recognize as a bogie.

In some embodiments, an additional step may include tracking the real position of the golf ball across the real putting area 112. This tracking may be performed with a golf ball tracking system that includes a golf ball and a GPS chip that is embedded within the golf ball. A transmitter and a beeper are also included. The transmitter is in communication with the GPS chip embedded within the golf ball through a GPS system. Though in other embodiments, other types of tracking devices known in the art may be used.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method for playing a golf game partially in a golf simulator and partially on a real golf course; the method comprising:
    providing a golf simulator for playing a golf game at least partially in the golf simulator, the golf simulator comprising a virtual golf ball, a virtual teeing area, a virtual fairway, and a virtual putting area;
    providing at least a portion of the real golf course for playing the golf game at least partially on the real golf course, the real golf course comprising a real golf ball and a real putting area;
    striking the virtual golf ball from the virtual teeing area;
    tracking a position of the virtual golf ball from the virtual teeing area to the virtual fairway;
    striking the virtual golf ball from the virtual fairway;
    tracking the position of the virtual golf ball across the virtual fairway to the virtual putting area;
    ascertaining, through a virtual grid, a starting position for the real golf ball in the real putting area, based on the position of the virtual golf ball in the virtual putting area;
    articulating at least one oral or visual instruction to indicate the position of the real golf ball on the real putting area;
    articulating the at least one oral or visual instruction to relay at least one golf related information;
    putting the real golf ball towards a target in the real putting area; and
    calculating a golf score based partially on strikes at the virtual golf ball from the virtual teeing area and the virtual fairway, and partially on strikes at the real golf ball from the real putting area.

2. The method of claim 1, further comprising a step of providing a software application for tracking the position of the virtual golf ball, the position of the real golf ball, and a player.

3. The method of claim 2, wherein the software application is operable on a portable communication device.

4. The method of claim 3, wherein the steps including, articulating at least one oral or visual instruction, are operable with the portable communication device.

5. The method of claim 1, further comprising a step of articulating the at least one oral or visual instruction to indicate the virtual position of the golf ball on the virtual teeing area and the virtual fairway.

6. The method of claim 1, wherein the real putting area comprises a hole, a sand bunker, and a hazard.

7. The method of claim 1, wherein the real putting area matches the visual appearance of the virtual putting area.

8. The method of claim 1, wherein the real golf course comprises a golf course having 1, 3, 6, 9, 18, 27, or any number of holes.

9. The method of claim 1, wherein the 18-hole golf course comprises a teeing area and 18 real putting areas.

10. The method of claim 1, wherein multiple players play on the 18-hole golf course.

11. A method for playing a golf game partially in a golf simulator and partially on a real golf course, the method consisting of:
    providing a golf simulator for playing a golf game at least partially in the golf simulator, the golf simulator comprising a virtual golf ball, a virtual teeing area, a virtual fairway, and a virtual putting area;
    providing at least a portion of the real golf course for playing the golf game at least partially on the real golf course, the real golf course comprising an 18-hole golf course, a real golf ball, and a real putting area;
    providing a software application for tracking the position of the virtual golf ball, the position of the real golf ball, and a player, the software application being operable on a portable communication device;
    striking the virtual golf ball from the virtual teeing area;
    tracking the position of the virtual golf ball from the virtual teeing area to the virtual fairway;

striking the virtual golf ball from the virtual fairway;

tracking the position of the virtual golf ball across the virtual fairway the virtual putting area;

ascertaining, through a virtual grid, a starting position for the real golf ball in the real putting area, based on the position of the virtual golf ball in the virtual putting area;

articulating, through the portable communication device, at least one oral or visual instruction to indicate the position of the real golf ball on the real putting area;

articulating, through the portable communication device, the at least one oral or visual instruction to relay at least one golf related information;

putting the real golf ball towards a target in the real putting area; and calculating a golf score based partially on strikes at the virtual golf ball from the virtual teeing area and the virtual fairway, and partially on strikes at the real golf ball from the real putting area.

12. The method of claim 11, wherein the real putting area comprises a hole, a sand bunker, and a hazard.

13. The method of claim 11, wherein the real putting area matches the visual appearance of the virtual putting area.

14. The method of claim 11, wherein the real golf course comprises an 18 hole golf course, the 18-hole golf course comprising a teeing area and 18 real putting areas.

15. A system for playing a golf game partially in a golf simulator and partially on a real golf course, the system comprising:

a golf simulator comprising a virtual teeing area, a virtual fairway, and a virtual putting area;

a virtual golf ball operable on the virtual teeing area and the virtual fairway, the real golf course comprising a real putting area that correlates to the virtual putting area;

a real golf ball operable on the real putting area;

a software application configured to track a position of the virtual golf ball across the virtual teeing area, the virtual fairway, and the virtual putting area;

a portable communication device emitting at least one oral or visual instruction, the at least one oral or visual instruction articulating at least one oral or visual instruction to indicate the position of the real golf ball on the real putting area, the at least one oral or visual instruction further articulating at least one golf related information; and a scoring system calculating a golf score based partially on strikes at the virtual golf ball from the virtual teeing area and the virtual fairway, and partially on strikes at the real golf ball from the real putting area.

16. The system of claim 15 further comprising a building for housing the golf simulator.

17. The system of claim 15, wherein the real putting area comprises a hole, a sand bunker, and a hazard.

18. The system of claim 15, wherein the real putting area matches the visual appearance of the virtual putting area.

19. The system of claim 15, wherein the real golf course comprises an 18-hole golf course, the 18-hole golf course comprising a teeing area and 18 real putting areas.

20. The system of claim 15, wherein multiple players play the golf game on the 18-hole golf course.

* * * * *